July 4, 1967 J. T. ZELLERS, JR., ET AL 3,329,491

METHOD AND APPARATUS FOR PRODUCING WINDOW GLASS SHEETS

Original Filed Oct. 4, 1957 4 Sheets-Sheet 1

INVENTORS
James T. Zellers, Jr.,
Roy A. Nyquist and
Henry R. Meriwether, Jr.
BY
Nobbe & Swope
ATTORNEYS July 4, 1967  J. T. ZELLERS, JR., ET AL  3,329,491
METHOD AND APPARATUS FOR PRODUCING WINDOW GLASS SHEETS
Original Filed Oct. 4, 1957  4 Sheets-Sheet 3

INVENTORS
James T. Zellers, Jr.,
Roy A. Nyquist and
Henry R. Meriwether, Jr.
BY Nobbe & Swope
ATTORNEYS 3,329,491
METHOD AND APPARATUS FOR PRODUCING WINDOW GLASS SHEETS
James T. Zellers, Jr., Charleston, W. Va., Roy A. Nyquist, Toledo, Ohio, and Henry R. Meriwether, Jr., Shreveport, La., assignors to Libbey-Owens-Ford Glass Company, Toledo, Ohio, a corporation of Ohio
Continuation of application Ser. No. 95,455, Mar. 13, 1961, which is a continuation of application Ser. No. 688,305, Oct. 4, 1957. This application Sept. 2, 1964, Ser. No. 395,355
7 Claims. (Cl. 65—84)

This application is a continuation of our copending application Ser. No. 95,455, filed Mar. 13, 1961, now abandoned, which in turn is a continuation of our earlier application Ser. No. 688,305, filed Oct. 4, 1957 (now abandoned.

The present invention relates broadly to the production of so-called sheet or window glass, and more particularly to improved techniques and apparatus for producing such glass with a minimum of distortion.

The term "window" or "sheet glass," as used herein, is intended to mean flat drawn glass having fire polished surfaces attained during the sheet formation, as distinguished from "plate glass" which has mechanically ground and polished surfaces.

As is well known, commercial sheet or window glass is produced by drawing a sheet or ribbon from a mass of molten glass directly into final usable form, and requires no subsequent surfacing treatment to impart smoothness and transparency. However, one of the disadvantages of flat drawn sheet glass has been waviness or so-called "distortion" in the finished product. Such distortion is due to a lack of thickness uniformity or, differently expressed, to alternately thick and thin areas in the glass sheet. Different varieties of distortion are known in the art by various names which have been coined to designate specific types. Among these are "long wave distortion," "short wave distortion," "hammer," "batter," etc.

It is our belief that these distortion defects in sheet glass are due to the presence of non-uniform and uncontrolled conditions within the window glass furnaces. More specifically, we believe they are due to a lack of sufficiently uniform temperature conditions from side to side of the stream or channel of molten glass flowing toward and into the zone of sheet formation, and also to the adverse influence of thermally induced air or convection currents that move toward, along and around the newly formed sheet.

Moreover, we have actually proven that the distortion difficulties that have heretofore been considered to be almost a characteristic of, as well as a necessary evil in commercial window glass production can be overcome by proper control of atmospheric and temperature conditions within the furnace.

Therefore it is the primary aim of this invention to substantially reduce, if not to entirely eliminate distortion defects in window glass, and distortion problems in its production.

Another object of the invention is to accomplish the above purpose by special control of air movements within the sheet glass furnace.

Another object is to assist in accomplishing the desired results by correctly regulating the temperatures in the molten glass across the width of the furnace.

Another object is the provision of special procedures and combinations of apparatus for carrying out the above aims.

Still another object is to generally improve temperature uniformity in window glass furnaces and to so eliminate alternate hot and cold streaks, lines, spots and the like in the molten glass.

Other objects and advantages of the invention will become more apparent during the course of the following description, when taken in connection with the accompanying drawings.

In the drawings, wherein like numerals are employed to designate like parts throughout the same:

FIG. 6 is a horizontal sectional plan view taken on line 6—6 of FIG. 4;

Figure 1:
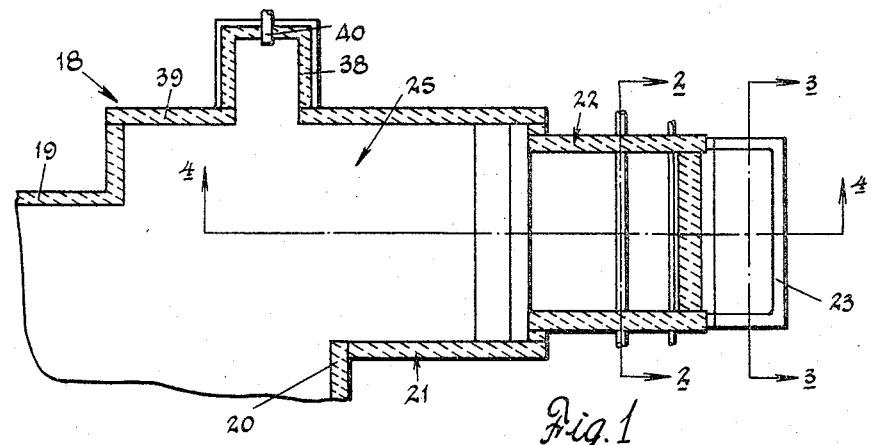
FIG. 1 is a fragmentary plan view of a window or sheet glass furnace and particularly of the refining and working end thereof.
Figure 4:
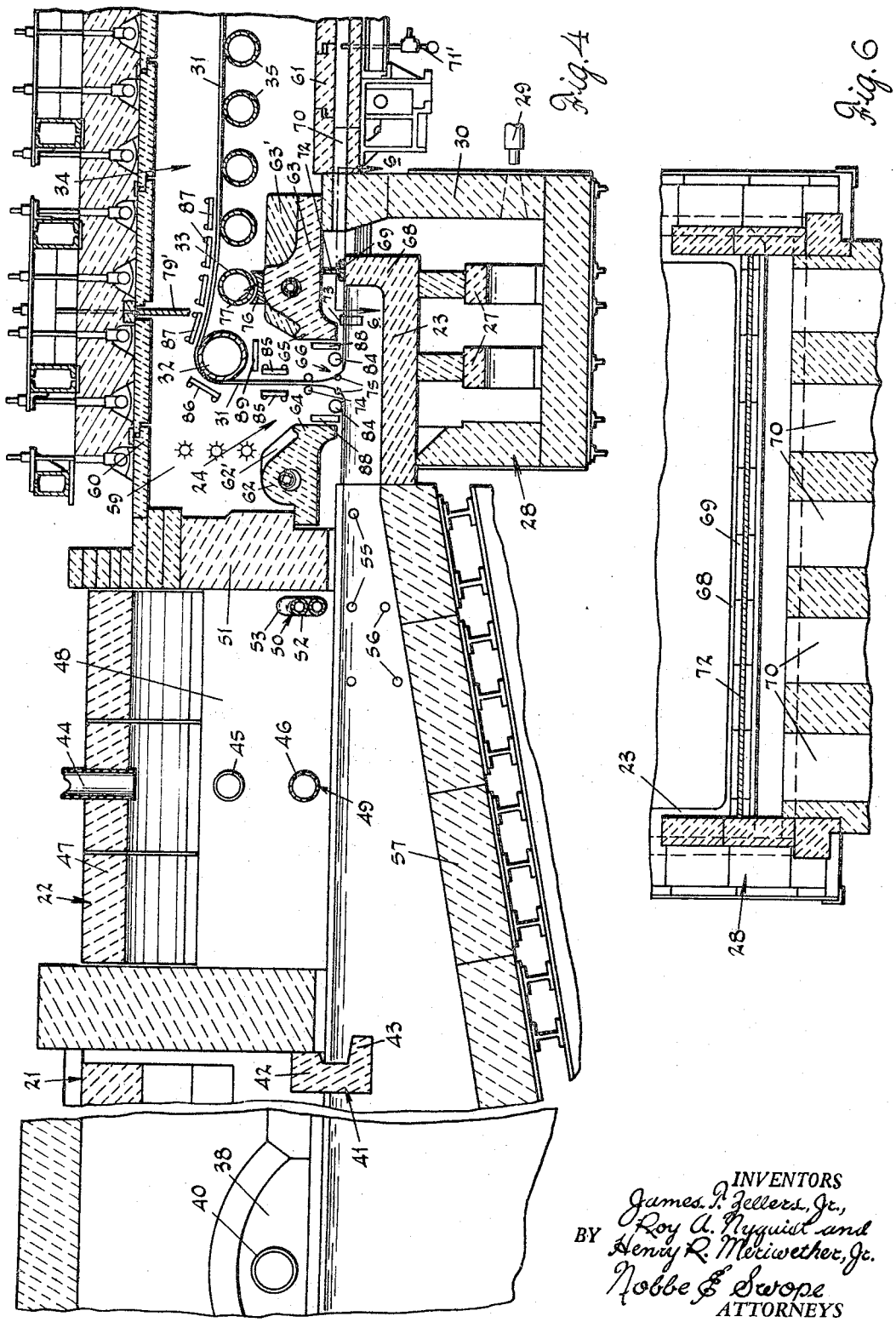
FIG. 4 is a longitudinal sectional view taken substantially along the line 4—4 of FIG. 1.

Referring now more particularly to the drawings, and with specific reference to FIG. 1, there has been illustrated therein the refining and working end of a continuous sheet glass furnace which is designated in its entirety by the numeral 18. Conventional furnaces of this character generally include a gas fired regenerative type melting tank 19 which supplies molten glass to one or more suitable refining or conditioning chambers. As here shown, there are provided a pair of such refining chambers, separated by a crotch wall 20, and one of which has been illustrated at 21. Although in no way restricted thereto, the present invention is particularly well adapted for use with a so-called Colburn type of sheet glass drawing machine and it will be described in that connection here. Thus, the forward end of the refining chamber 21 is joined by a cooling chamber 22 to a draw-pot 23 positioned below a drawing or forming chamber 24 (FIGS 1 and 4).

Now with a continuous tank furnace such as just described, a mass of glass 25 is melted in the melting tank 19 and flows from the melting end into and through the refining chamber 21 within which it is properly conditioned. From the refining chamber the molten mass moves through the cooling chamber 22 where it is gradually brought down toward working temperature, and finally it flows into the working receptacle or draw-pot 23 from which a sheet or ribbon of glass may be continuously drawn.

The draw-pot 23 in a conventional Colburn type window glass machine is supported upon stools 27 within a pot chamber 28 which is heated by gas flames from burners 29 introduced into and through the walls 30.

A sheet or ribbon of glass 31 is continuously drawn upwardly from the surface of the molten bath within the draw-pot and, while still in a semi-plastic condition, although substantially set in its final sheet form, is deflected into the horizontal plane about a bending roll 32 and then passed over a so-called idler or intermediate roll 33 and through a flattening chamber 34 wherein the said ribbon is supported and carried forwardly upon a series of horizontally aligned machine rolls 35. The ribbon advances from the drawing and flattening chamber 34 into a lehr 36 wherein it is supported and carried along upon a series of horizontally aligned rolls 37 until suitably annealed.

Now it has been customary in most attempts to improve window glass distortion to take the corrective measures only in and around the zone of sheet formation. We agree that this is of considerable importance. But we have also found that for the very best results certain steps can and preferably should be taken long before this.

To illustrate, it has heretofore been considered to be impossible to produce window glass without ream unless skim bars were employed in the refining chamber and, in fact, it has been conventional to provide so-called skim pockets 38 in the side walls 39 of the furnace for use therewith. Such skim bars serve a useful purpose but they do have bad features and, in addition, there is approximately a twenty minute loss in production every time they have to be cleaned.

Now we have found that when we introduce cooling air through the skim pockets 38 by means of pipes 40 we can remove the skim bars and still eliminate ream in this area. Moreover the cooling air also acts to stabilize the glass temperature in advance of the cooling chamber to even-out hot and cold streams and improves both yield and metal quality.

The importance of ream elimination in any anti-distortion program is of course obvious because the presence of the different kinds of glass which show up as ream produce and are responsible for cordiness in the finished glass sheet.

Another important feature of the invention which has a direct relationship to the introduction of cooling air into the refining chamber is the locating of a special cut-off bar 41 partially above and partially below the molten glass at the entrance to the cooling chamber 22. This bar which is here shown as of generally L-shape may have an enlarged portion 42 on the upper end of the vertical leg and a preferably angled ledge 43 on the upper surface of the horizontal leg and acts to provide both an air and a liquid seal between the cooling and refining chambers.

This seal makes it possible to introduce sufficiently large amounts of cooling air through the pipes 40 into the refining chamber to accomplish the purposes already set forth, and also to nullify the adverse effects of the pressure change in the refining chamber that results from the flame reversal at the regenerators. We have determined that this pressure change has heretofore been largely responsible for the production of streaks of cross ream as a result of alternately following cold and hot streams of air and combustion gases from side to side of the furnace.

Another advantage of being able to introduce the larger amounts of cooling air into the refining chamber is that it permits removal of certain pipe coolers that were formerly used close to the glass in the vicinity of the zone of sheet formations to maintain drawing speed but which concededly produced "hammer" in the finished sheet.

Because of its special shape, the bar 41 also sets up a backflow of hot glass toward the side edges of the cooling and refining chambers near the glass surface that assists in establishing more uniform glass temperature conditions across the cooling chamber. Thus, this shape of bar produces a downward and then upward flow of molten glass as it enters the cooling chamber 22 which results in a continual surge of glass onto and laterally along the lip 43 of the bar. As the lateral flow lessens, the glass again flows downwardly and in so doing causes a return flow of the cooled glass in the edge areas and in the vicinity of the side walls of the chambers with the result that such glass becomes subject to a rearward current which operates to return the cooled glass into the refining chamber 21 and toward the higher temperature molten glass in the melting zone of the furnace.

Although generally referred to as a "cooling" chamber the chamber 22 may be more aptly described as a heat extracting chamber since the temperature of the glass passing therethrough is usually lowered through radiation of heat therefrom to at least as great an extent as by positive cooling. Consequently, improved temperature uniformity can be achieved by insulating the longitudinal margins of the cap 47 and the side walls 48 as shown at 47' and 48' respectively. In this way radiation from the normally cooler side areas of the glass stream will be retarded and, of course, the insulation can be of graduated thickness and extent to give a controlled retardation of heat radiation. Further stabilization of temperature may be achieved within the chamber 22 by the introduction of cooling air into this chamber also through pipes 44, 45 and 46.

Figure 2:
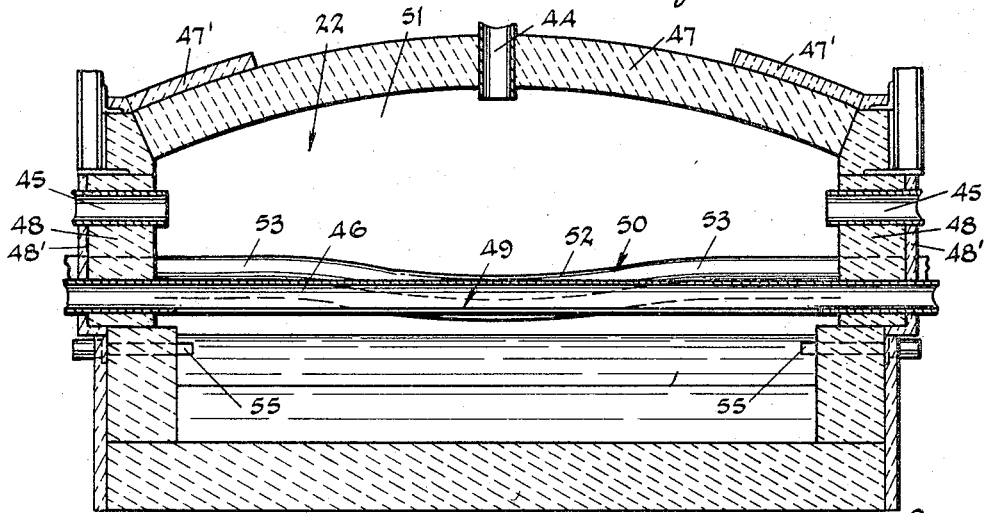
FIG. 2 is a transverse vertical sectional view through the cooling chamber of the furnace of FIG. 1, taken substantially along the line 2—2.

As best seen in FIG. 2, the pipe 44 is vertically disposed in the chamber arch or cap 47 while oppositely disposed pipes 45 are mounted to introduce air through the chamber's side walls 48. Pipe 46 extends across the chamber adjacent the glass surface and is provided with an axially aligned slot 49 formed in the lower surface thereof and positioned to direct an air stream downwardly onto the glass.

By introducing air into the cooling chamber in this way a somewhat pressurized control can be exerted to counteract the entry of outside air. In other words, the pressure of air introduced through pipes 44, 45 and 46 can be proportioned to create a static condition along the walls 48 of the chamber; and pipes 45 and 44, being of a common pressure, will stabilize the ambient air within the chamber and across the glass surface. This will tend to equalize the surface temperature and the air emanating from the slot 49 in pipe 46 can be controlled to uniformly reduce and to assist in equalizing the surface temperature of the molten glass flowing therebeneath.

The importance of this regulated introduction of volumes of air ino the cooling chamber and the more or less pressurized control of the atmosphere in this chamber can best be appreciated when it is understood that such outside influences as barometric pressures, that vary hour by hour, normally act to set up unbalanced pressure conditions between the outside atmosphere and that in the furnace. This has heretofore resulted at least periodically, in an objectionable influx of dirt-carrying air from the outside through the furnace wall structures to create an undesirable turbulence in the furnace atmosphere. Moreover, because the action resulting from the unbalanced pressure condition varies in degree throughout the arch area of the chamber, it produces downwardly flowing streams of air which alter the thermal characteristics of the glass surface in a non-uniform manner to develop streaks of relatively cool glass even in areas of normally high temperatures.

The introduction of cooling air into the refining and cooling chambers in the several ways that has just been described, and the special manner in which this air is controlled and applied, is part of the overall aim of this invention to equalize the temperature of the moving stream of molten glass across its entire width and to thereby create a substantially uniform consistency in the stream of molten glass in every strata thereof at any given cross-sectional area.

One more item which contributes to this purpose, and which also acts to put what might be termed a "cooled layer" on the surface of the glass whereby to help maintain the speed of draw, is a plurality of superimposed cooler pipes 50 near the discharge end and closely adjacent the end wall 51 of the cooling chamber. These pipes, as best seen in FIGS. 2 and 4, are formed with a downwardly curving middle section 52 which approaches quite closely to the surface of the molten glass and side sections 53 which are positioned a slightly greater distance above the molten stream. They are preferably water-cooled and act to extract heat from and so reduce the temperature of the central, and relatively hotter, area of the molten stream to a greater extent than the temperature of the relatively cooler side areas.

As a further means of bringing the temperature of the edge glass up to that at mid-stream, electrodes 55 may be arranged in the side areas of molten glass under and at either side of the wall 51 and spaced sufficiently to pass electrical energy through the molten glass flowing therebetween to heat the same by the Joule effect. The electrodes 55 are preferably located slightly below the glass surface and can be increased in number along the walls of the cooling chamber as desired. In fact, additional electrodes, as indicated at 56, may be employed in more submerged positions to carry out the heating effect and to more rapidly bring the edge glass to the desired temperature.

The last and perhaps the most important control feature in connection with the cooling chamber is the provision of an angled or sloped bottom 57 therefore and which as here shown preferably extends over the major portion of the length of the cooling chamber. In order to more completely understand the operation of this angled bottom arrangement it should be understood that one of the characteristics of the Colburn type of sheet glass drawing machine is the relatively shallow draw-pot or working receptacle from which the ribbon of glass is drawn. One of the principal functions of the so-called cooling chamber in connection with such a machine, in addition to its primary function of bringing glass temperature down to working level, is to provide a channel through which the molten glass flows from a relatively deep refining chamber to the relatively shallow draw-pot. Heretofore the change of level has been accomplished by the use of one abrupt step at the exit end of the refining chamber and a second somewhat more gradual but still quite steep step, usually in the form of a so-called "goose-neck," between the floor of the cooling chamber and the floor of the draw-pot.

However, we have found that surprisingly better results from all standpoints and including those relating to distortion problems have been obtained by the substitution of a long, sloped bottom in the cooling chamber for the prior stepped construction. The primary action of this sloped arrangement is that it permits a smooth uniform flow of glass from the refining chamber into and through the cooling chamber and into the draw-pot that effectively eliminates any serious formation of devitrified glass or dog metal in and around the cooling chamber.

Figure 9:
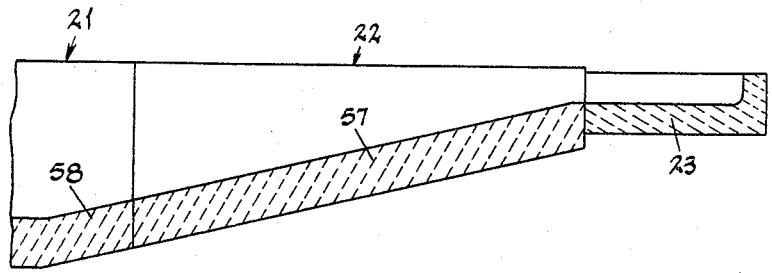
FIGS. 9, 10 and 11 are longitudinal sectional views through the cooling chambers and draw-pots of three modified forms of the invention.
Figure 10:
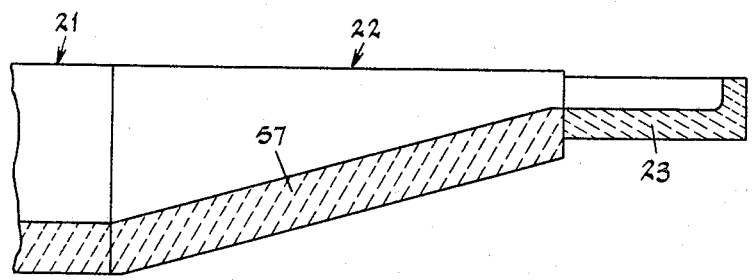
Figure 11:
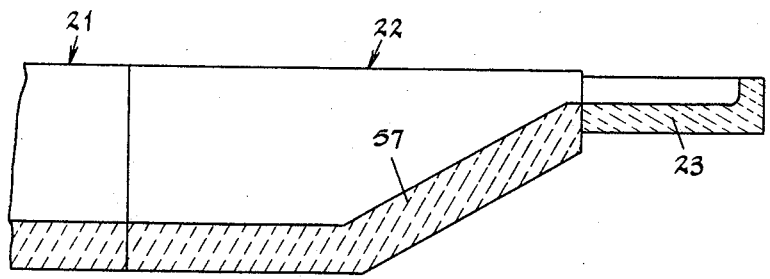

As indicated above, the important feature seems to be that the change in level between the bottom wall of the refining chamber and the bottom wall of the pot be a gradual and a continuous one with no sharp changes in level or interruption to glass flow as the depth of the channel decreases from that of the refining chamber to that of the draw-pot. The actual length of the sloped bottom of the cooling chamber seems to be of less importance since excellent results have been obtained when the sloped bottom 57 of the cooling chamber extended from a similarly sloped bottom 58 of the refining chamber that lead to the full refining chamber depth as shown in FIG. 9; and good results have also been obtained when the sloped cooling chamber bottom 57 terminated at the entrance end of the cooling chamber as shown in FIG. 10; and also when it terminated somewhat inwardly of the entrance end of the cooling chamber in a flat bottomed portion of the same depth as the refining chamber as shown in FIG. 11.

In any event there is a definite relationship between the slope of the cooling chamber and the location of the bar 41. Thus, it appears that the bar 41 must be so located relative to the sloped bottom 57 as to provide a sufficient depth of glass therebeneath. Our work strongly indicates that there must be at least twelve inches of glass between the bottom of the bar 41 and the bottom of the cooling chamber directly thereunder for completely satisfactory operation.

It will also be seen from the above that the sloped bottom of the cooling chamber and the side electrodes in the exit end of the cooling chamber have somewhat similar and overlapping functions. In other words, each of these different features acts to eliminate dog metal and to reduce edge drag. This is extremely important in the matter of eliminating distortion because it makes possible a uniform flow of glass through the shallowing channel between the refining chamber and the draw-pot and consequently assists in maintaining a uniform temperature across the width of the molten glass moving through the restricted channel.

The accumulative effect of the various controls that have been thus far described is to bring the stream of molten glass to the draw-pot 23 properly conditioned, free of defects, and at a uniform temperature of a degree compatible with the thickness and speed at which the glass sheet or ribbon 31 is being drawn.

We again want to emphasize the extreme importance, in eliminating distortion defects in the finished glass ribbon, of the described control treatment and channeling of the glass stream. Admittedly the procedures from this point on, and especially in the actual zone of sheet formation and in the area where the glass is drawn from the molten into the solid state, are also extremely important and, in some instances at least, may properly be said to be even more critical than the preforming procedures.

However, we have discovered that the very best results in eliminating distortion defects in the commercial manufacture of window glass are obtained when the proper combination of pre-drawing, drawing and post-drawing techniques are employed.

Probably one of the most important procedures in the actual drawing or forming of the glass ribbon, insofar as it relates to the prevention of distortion defects in the sheet being produced, is the feature of maintaining the forming chamber 24 within which the sheet is drawn as nearly as possible a closed chamber. In this way it is possible to maintain a substantially quiescent atmosphere in and around the newly formed sheet and to properly control any air movements that may be set up in the area.

Figure 3:
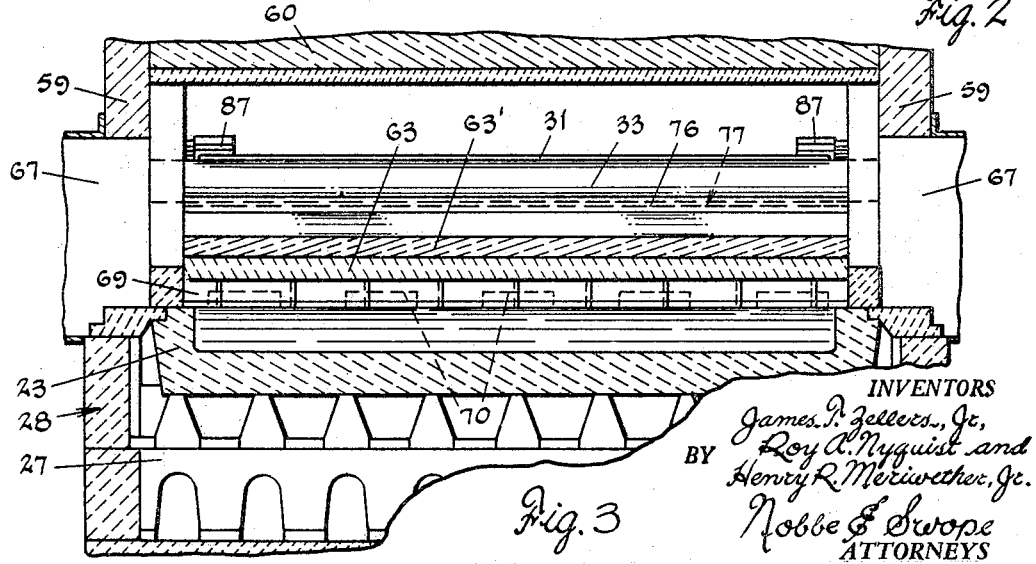
FIG. 3 is a fragmentary transverse, vertical sectional view through the drawing chamber of FIG. 1, as taken on line 3—3.

As best shown in FIGS. 3, 4 and 6, the forming chamber 24 and the adjoining flattening chamber 34 are normally defined and partially enclosed by an end wall 51, which also serves as the end wall of the chamber 22, by oppositely disposed side walls 59 and by a roof 60. The bottom of the flattening chamber 34 is closed by the wall 61, while the bottom of the forming chamber 24 is substantially closed off from the draw-pot by conventional front and back lip-tiles 62 and 63 respectively which also act to define, between their opposed faces 64 and 65, the actual zone of sheet formation 66 within the drawing chamber 24.

Observation bays or openings 67 are provided in the side walls 59, and these openings can also be used to connect certain of the operating mechanism of the drawing machine to its drive means outside of the drawing chamber. However, these openings are conventionally provided with transparent closures (not shown) which embody portions that fit closely around any parts projecting therethrough and effectively seal the drawing chamber against any substantial movement or infiltration of air into or out of the chamber at these points.

In the operation of the so-called Colburn type machines, provision must be made to prevent devitrification of the glass in the relatively stagnant rear or closed end of the draw-pot. It has heretofore been customary to shape the inside of the rear wall of the pot chamber 28 and the bottom surface of the rear lip-tile 63 in a manner designed to direct the hot gases and products of combustion from the pot chamber upwardly, laterally and then downwardly over the rear wall 68 of the draw-pot onto the molten glass adjacent thereto.

However, we have found that this prior method of increasing the temperature of the glass in the rear end of the draw-pot is a serious source of dirt, uncontrolled air currents and other defect producing conditions. And, in accordance with the present invention, we propose to completely close off the pot chamber from the area above the molten glass, and to provide a different route for the removal of the products of combustion from the pot chamber.

As best indicated in FIG. 4 this can be accomplished by the provision of an inverted T-shaped partition or wall 69, extending between the upper surface of the rear wall of the draw-pot and the bottom surface of the lip-title 63, in combination with passageways 70, in the bottom wall 61, that are connected to a suitable duct 71 (FIG. 5) leading to a conventional exhaust fan system or stack (not shown). A thermocouple 71' can be arranged in the passageways 70 to control the temperature of the gases passing therethrough by regulating the exhaust means. This way of exhausting the products of combustion from the pot chamber also serves the additional purpose of counteracting the normal tendency of the hot upwardly rising pot gases to infiltrate into the drawing chamber as a result of the normal stack action within the chamber.

The vertical wall 72 of the partition 69 is preferably made as thin as is practicable without too greatly reducing its structural strength in order to permit it to transmit as much radiant heat as possible into the space beneath the lip-tile 63 and onto the surface of the molten glass in the draw-pot. Even so, however, the partitioning off of the glass in the pot from the pot chamber may result in the glass at the rear of the draw-pot being too cool.

To overcome this possibility, and to further equalize the temperature of the molten glass in the drawpot from side to side thereof, electrodes 73 are provided. These electrodes are preferably positioned in the area of the rear corners of the draw-pot, and may either be inserted through the side walls of the pot or, as shown in FIG. 4, may be supported so as to extend downwardly into the molten glass. When power is applied, there will be a tendency for the electrical energy to go from the electrode at one corner of the pot to the electrode at the other corner of the pot and to so heat the glass along the back of the pot by Joule effect. However, experience has shown that, with electrodes positioned in the manner indicated in the drawings, the greater part of the current will flow from the electrodes through the side edge portions of the glass in the pot through the metal width maintaining devices 74 and 75, across the meniscus of the rising sheet to the corresponding width maintaining devices on the opposite side and thence through the glass in the side edge of the pot to the other electrode.

This direction of current flow is of material assistance in obtaining the proper temperature of the molten glass in and around the meniscus, in preventing undue chilling of the glass by the width maintaining means, and in otherwise promoting uniformity of temperature throughout the molten glass that is actually going into the rising sheet.

To this same end the lip-tiles 62 and 63 may be insulated as shown at 62' and 63' to assist in equalizing the temperature from side to side of the glass stream beneath the lip-tile 62 and to retard radiant heat loss from the glass beneath the lip-tile 63 in the stagnant end of the draw-pot.

In addition to its function of closing off a portion of the lower part of the forming chamber 24 from the draw-pot, the upper portion of the lip-tile 63 also acts to partially partition off that part of the flattening chamber 34 which lies beneath the horizontal run of the glass sheet 31 from the portion of the forming chamber 24 immediately adjacent the zone of sheet formation 66. To complete the partitioning in this area there is provided a bar 76 mounted on top of the lip-tile and having a curved upper surface 77 which substantially conforms to the curve of the idler roller 33.

Figure 5:
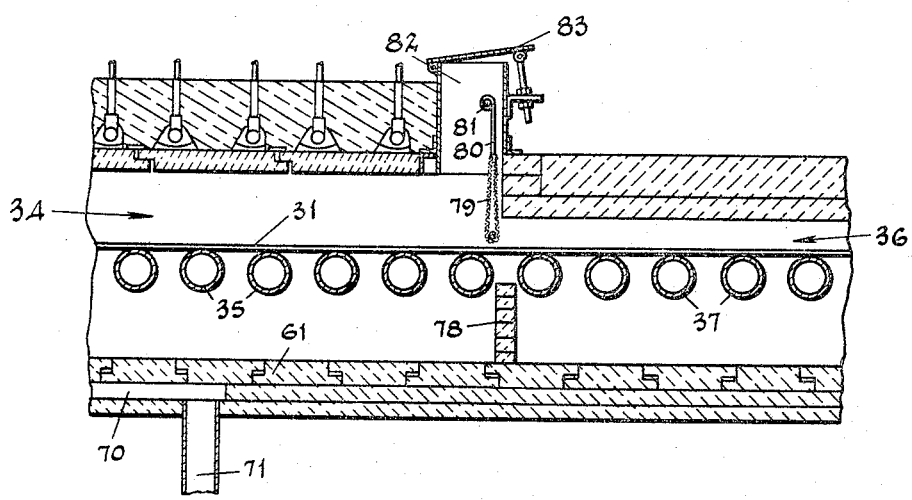
FIG. 5 is a longitudinal sectional view of an extension of the drawing chamber shown in FIG. 4, and of the forward end of the annealing lehr connected thereto.

As shown in FIG. 5, the lower part of the flattening chamber 34 is partitioned off from the lehr 36 by a brick wall 78 and the upper part by a curtain 79 of a flexible material such as glass fibers that is suspended for vertical adjustment by cables 80 from a rotatably mounted shaft 81. A second adjustable curtain 79' can be used with or without the curtain 79 to cut off the flattening area and lehr from the drawing area above the horizontal run of the glass ribbon.

To provide for any necessary air or gas removal from the forming chamber 24 and flattening chamber 34, there is provided a stack or flue 82 (FIG. 5) equipped with an adjustable damper plate 83 for closely regulating the exhaust therefrom. By proper control of the damper plate 83, uncontrolled air movements can be prevented and a very minimum of stack action through the drawing and flattening chambers can be established and maintained. Besides taking care of any necessary removal of gas or air from the chambers 24 and 34, the stack 82 also provides a means for by-passing and removing air that might otherwise filter into the discharge end of the flattening chamber either from the outside or from the lehr 36.

A similar action in by-passing and removing incoming air that might infilter through the machine enclosure due to pressure changes in the outside atmosphere is effected by exhaust pipes 84 positioned at opposite sides of the drawing chamber in the zone of sheet formation (FIG. 4). We have found such an arrangement to be of considerable importance since it is virtually impossible to provide a completely air tight enclosure for glass making furnaces or machinery.

Air may be exhausted from the drawing chamber 24 by various means and from many positions, but thus far we have had the best results when using a pair of independently controlled exhaust pipes at opposite sides of the chamber and positioned one on each side of the sheet very near to the surface of the molten glass.

Of course the by-passing of air as described above is only one of the functions of the exhaust pipes 84. An even more important one is that of maintaining a static or slightly sub-atmospheric pressure within the drawing chamber and particularly in the zone of sheet formation. This is of great value in maintaining a quiescent atmosphere around the newly formed sheet and in preventing unwanted and uncontrolled air movements and convection current being set up. In the same way, the pull of the pipes 84 can be so regulated, with relation to the action of the stack 82, as to completely obviate any stack action within the actual zone of sheet formation and to maintain a relatively quiescent atmosphere for the ribbon of glass from the point of its formation to the lehr.

Before leaving the matter of machine enclosures, and the control of the air movements within such enclosures, it is important to point out that it has been customary in the operation of so-called Colburn type drawing machines to play gas flames on or in the vicinity of the newly-formed sheet for the purpose of controlling the temperature or plasticity of the glass; and that we have discovered that the presence of such gas flames within the machine enclosures has been a considerable factor in the creation of undesirable air movements within the enclosures.

Nevertheless adequate means for localized heating of the glass ribbon are important, and we have found that this can be provided without the objectionable features of gas burners by substituting suitable electrical heating means for the burners wherever it is desired to selectively heat the glass ribbon within the enclosures.

Thus, electrical resistance heaters 85 may be provided on opposite sides of the rising sheet adjacent the margins thereof for heating the sheet edges just before they reach the bending roll. Similar heaters 86 may be provided to act on the sheet edges while the glass is actually being bent from the vertical into the horizontal plane, and still other units 87 of the same character may be employed to control the temperature of the sheet edges as they move into the flattening chamber.

It will be appreciated that there are many details of the conventional Colburn type sheet drawing machines that have not been illustrated in the drawings of this application, and other details that have been illustrated but not described since they are neither original with the applicants here nor necessary to the practice of the invention. In this latter category are such items as the sheet coolers 88 and the bending roll cooler 89, all of which are conventionally employed in one form or another in producing window and sheet glass by the Colburn method.

This same thing may be said of the width maintaining devices previously referred to, insofar as the present invention's being dependent on the use of any specific form of width mantaining devices is concerned. As a matter of fact, a large number of various types of width maintaining devices have been tried and used even commercially on Colburn type machines. In all cases they engage the edges of the rising glass sheet at the meniscus and act to overcome the inherent tendency of a drawn glass sheet to narrow to a thread. Perhaps the most widely used and best known form of width maintaining devices are the so-called knurled rolls, and we prefer to use with maintaining devices of this general type in practicing our invention.

However, we have found that the use of a new and particular form of roller type width maintainer, in combination with the other features of our invention, may actually have some part in overcoming certain distortion defects that would otherwise be present in the finished sheet. This is because these different width maintaining rolls have been found to eliminate the cup or wave adjacent the sheet edges that has been a characteristic of the conventional knurled rolls, as well as acting to widen the sheet which is their primary purpose.

Figure 7:
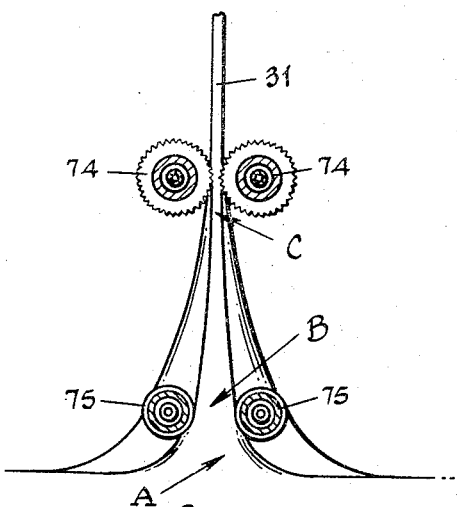
FIG. 7 is an enlarged detail view of the special width maintaining rolls of the invention.

This special roller width maintaining device, which is best shown in FIG. 7, comprises a pair of knurled rolls 74 similar to the conventional knurl rolls and a pair of smaller smooth rolls 75 positioned near the base of the sheet 31. The pairs of rolls 74 or 75 may be water or air cooled but we have operated them successfully with no cooling at all. The auxiliary or lower pair of rolls 75 are spaced apart sufficiently to reduce the thickness of the meniscus, indicated at A, to a lesser thickness, as is indicated by the letter B. Both the smooth rolls 75 and knurl rolls 74 are positively driven, preferably at the same r.p.m. However, the peripheral speeds will be different, and a definite "draw" is imposed on the sheet edge C by reason of the rolls 75 being of a smaller diameter than the upper knurl rolls 74. This causes the rolls 74 to draw or stretch the glass between the pairs of rolls and to thin down the edge C. In actual practice, this produces a sheet of glass having a greater width of acceptably useable glass, and greatly reduces the cup or wave defect.

Figure 8:
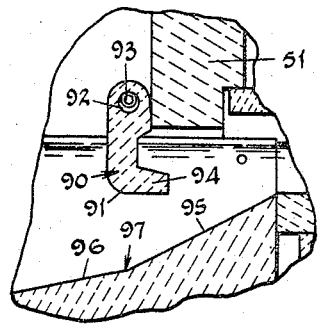
FIG. 8 is a fragmentary sectional view at the end of the cooling chamber, showing a modified form of structure.

A modified form of closure for the discharge end of the cooling chamber 22 has been illustrated in FIG. 8. This consists primarily in the substitution of a generally L-shaped block 90 for the pipe cooler 50 as shown in FIG. 4. The block 90 is very similar to the block 41 at the entrance end of the cooling chamber except that it is somewhat smaller, has a rounded lower rear surface 91 to facilitate movement of the molten glass therebeneath, and is provided with an opening 92 to receive a support bar 93. The block 90 functions in the same manner as the block 41 to provide an air and liquid seal or "cut-off" for the discharge end of the cooling chamber, and to carry the relatively hot glass at the middle of the stream toward and rearwardly among the margins by lateral and back flow of surface glass along the ledge 94.

To insure sufficient space between the bottom wall of the block 90 and the inclined floor of the cooling chamber (it should not be less than six inches) it may be necessary, in addition to reducing the size of the block, to provide different angles of slope 95 and 96 in the cooling chamber floor and which meet just below the block 90 as at 97.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a method of producing window glass in sheet form and substantially free of distortion from a continuous window glass furnace that contains a mass of molten glass and in which the atmosphere above the glass in the furnace is confined, by first melting the glass in a relatively deep area at one end of said furnace, flowing it therefrom through successive refining and cooling areas into a relatively shallow working area at the opposite end and drawing it upwardly therefrom in sheet form; the steps of maintaining at least part of the confined atmosphere above the glass in the cooling area separate from and independent of the confined atmosphere upstream thereof, causing the upper strata of molten glass from said refining chamber to move downwardly toward, upwardly into and laterally within said cooling area and gradually, uniformly and continuously reducing the depth of the molten glass in said furnace from the depth at the relatively deep melting end to the depth at the relatively shallow working end substantially within said cooling area.

2. In a continuous window glass furnace comprising a relatively deep melting tank, a relatively deep refining tank, a cooling tank and a relatively shallow working receptacle arranged in end to end communicating relationship with side walls and a roof confining the atmosphere above the molten glass in said furnace, a wall hermetically sealing off at least part of the confined atmosphere above the molten glass in said cooling tank from the confined atmosphere above the molten glass upstream thereof and under which the upper strata of molten glass from said refining tank must pass into the cooling tank, a slotted pipe extending transversely of said cooling tank within the confined atmosphere thereabove for introducing cooling air into said confined atmosphere and directing it toward the surface of said molten glass, and a bottom wall in said cooling tank at least a portion of which is sloped uniformly and continuously upward from the level of the bottom wall of said relatively deep melting tank to the level of the bottom wall of said relatively shallow working receptacle.

3. In a continuous window glass furnace comprising a relatively deep melting tank, a relatively deep refining tank, a cooling tank and a relatively shallow working receptacle arranged in end to end communicating relationship with side walls and a roof confining the atmosphere above the molten glass in said furnace, a wall hermetically sealing off at least part of the confined atmosphere above the molten glass in said cooling tank from the confined atmosphere above the molten glass upstream thereof and under which the upper strata of molten glass from said refining tank must pass into the cooling tank, and a bottom wall in said cooling tank at least a portion of which is sloped uniformly and continuously upward from the level of the bottom wall of said relatively deep melting tank to the level of the bottom wall of said relatively shallow working receptacle.

4. In a method of producing window glass in sheet form and substantially free of distortion from a continuous window glass furnace that contains a mass of molten glass and in which the atmosphere above the glass in the furnace is confined, by first melting the glass in a relatively deep area at one end of said furnace, flowing it therefrom through successive refining and cooling areas into a relatively shallow working area at the opposite end and drawing it upwardly therefrom in sheet form; the steps of maintaining at least part of the confined atmosphere above the glass in the cooling area separate from and independent of the confined atmosphere upstream thereof, gradually, uniformly and continuously reducing the depth of molten glass in said furnace from the depth at the deep melting end thereof to the depth at the shallow working end thereof substantially within said cooling area, directing the upper strata of molten glass from said refining area first downwardly and then upwardly into said cooling area, and introducing cooling air into each of said separated and independent confined atmospheres above the glass.

5. In a method of producing window glass in sheet form and substantially free of distortion from a continuous window glass furnace that contains a mass of molten glass and in which the atmosphere above the glass in the furnace is confined, by first melting the glass in a relatively deep area at one end of said furnace, flowing it therefrom through successive refining and cooling areas into a relatively shallow working area at the opposite end and drawing it upwardly therefrom in sheet form; the steps of gradually, uniformly and continuously reducing the depth of molten glass in said furnace from the depth at the deep melting end thereof to the depth at the shallow working end thereof substantially within said cooling area, and directing a stream of air extending at an angle to the direction of flow of molten glass through said furnace onto the surface of the molten glass in said cooling area.

6. In a method of producing window glass in sheet form and substantially free of distortion from a continuous window glass furnace that contains a mass of molten glass and in which the atmosphere above the glass in the furnace is confined, by first melting the glass in a relatively deep area at one end of said furnace, flowing it therefrom through successive refining and cooling areas into a relatively shallow working area at the opposite end and drawing it upwardly therefrom in sheet form; the steps of maintaining at least part of the confined atmosphere above the glass in the cooling area separate from and independent of the confined atmosphere upstream thereof, gradually, uniformly and continuously reducing the depth of molten glass in said furnace from the depth at the relatively deep melting end thereof to the depth at the relatively shallow working end thereof substantially within said cooling area, directing the upper strata of molten glass from said refining area first downwardly and then upwardly into said cooling area, and introducing cooling air into the separated and independent confined atmosphere above the glass in the cooling area by directing a stream of air extending at an angle to the direction of flow of molten glass through said furnace onto the surface of the molten glass in said cooling area.

7. In a continuous window glass furnace comprising a relatively deep melting tank, a relatively deep refining tank, a cooling tank and a relatively shallow working receptacle arranged in end to end communicating relationship and each having a bottom wall, at least a portion of the bottom wall of said cooling tank sloping uniformly and continuously upward from the level of the bottom wall of the relatively deep melting tank at one end of said furnace to the level of the bottom wall of the shallow working receptacle at the opposite end thereof, said furnace having side walls and a roof confining the atmosphere above the molten glass in said furnace, a wall hermetically sealing off at least part of the confined atmosphere above the molten glass in said cooling tank from the confined atmosphere above the molten glass upstream thereon and under which the upper strata of molten glass from said refining tank must pass into the cooling tank, and means for introducing air into the confined atmosphere above the molten glass in the cooling tank and for introducing cooling air into the independent and separate confined atmosphere upstream thereof.

References Cited
UNITED STATES PATENTS

| | | | |
|---|---|---|---|
| 1,547,797 | 7/1925 | Ewing | 65—26 |
| 1,606,409 | 11/1926 | Fowle | 65—202 |
| 1,676,027 | 7/1928 | Harvey | 65—83 |
| 1,726,114 | 8/1929 | Morton | 65—157 |
| 1,888,496 | 11/1932 | Ferngren | 65—355 |
| 1,953,023 | 3/1934 | Mulholland | 65—135 |
| 1,980,992 | 11/1934 | Halbach | 65—345 |
| 2,049,600 | 8/1936 | Wright | 65—137 |
| 2,064,546 | 12/1936 | Kutchka | 65—206 |
| 2,121,958 | 6/1938 | Forman et al. | 65—95 |
| 2,478,090 | 8/1949 | Devol | 65—137 |
| 2,726,486 | 12/1955 | Brichard | 65—8 |
| 2,911,759 | 11/1959 | Pilkington | 65—157 |
| 2,945,325 | 7/1960 | Deible et al. | 65—178 |

DONALL H. SYLVESTER, *Primary Examiner.*

D. CRUPAIN, F. W. MIGA, *Assistant Examiners.*